Jan. 13, 1959   J. A. SCHONHOFF ET AL   2,868,932
DUMMY LOAD RESISTOR
Filed Sept. 19, 1956   5 Sheets-Sheet 1
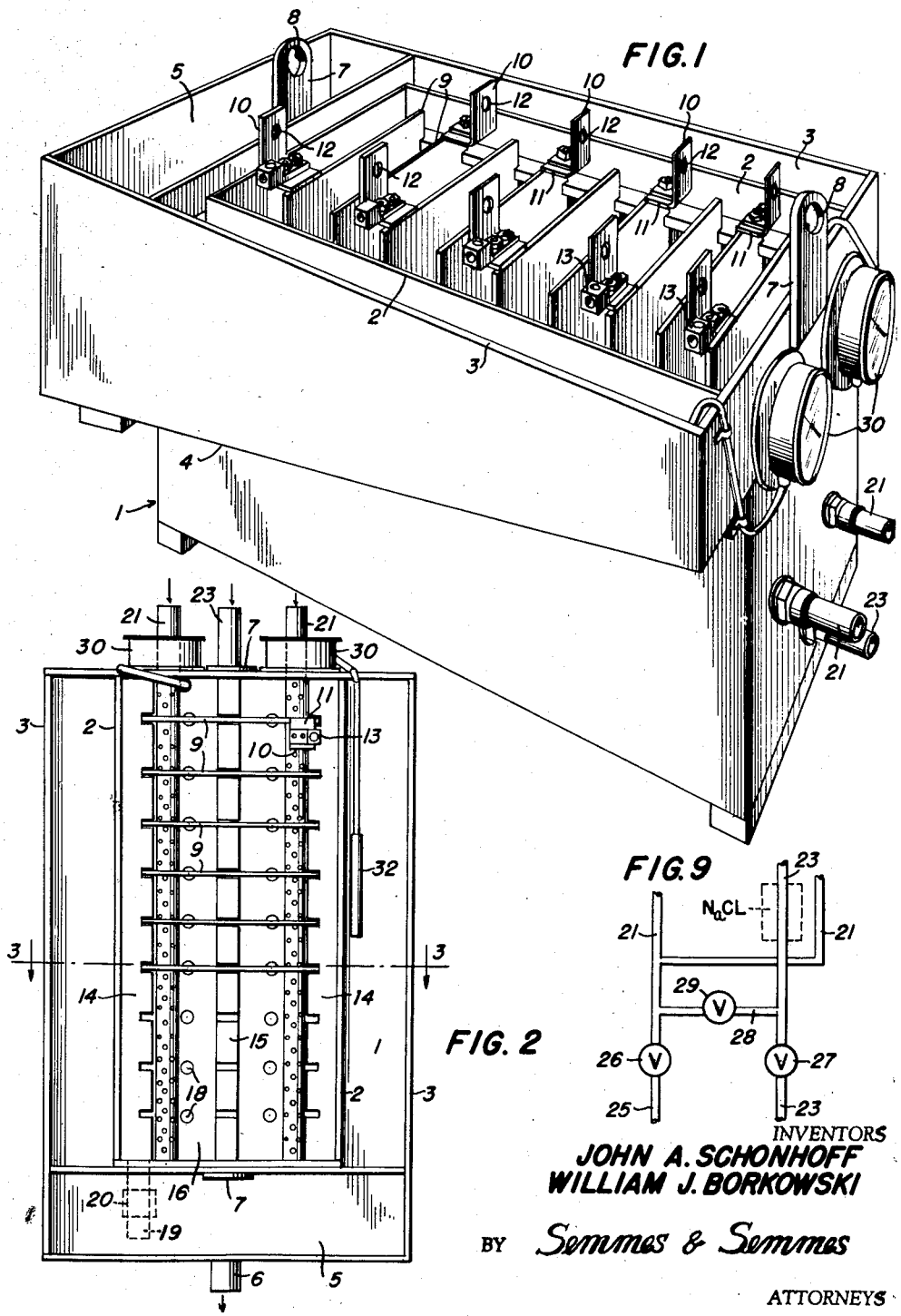
INVENTORS
JOHN A. SCHONHOFF
WILLIAM J. BORKOWSKI
BY *Semmes & Semmes*
ATTORNEYS

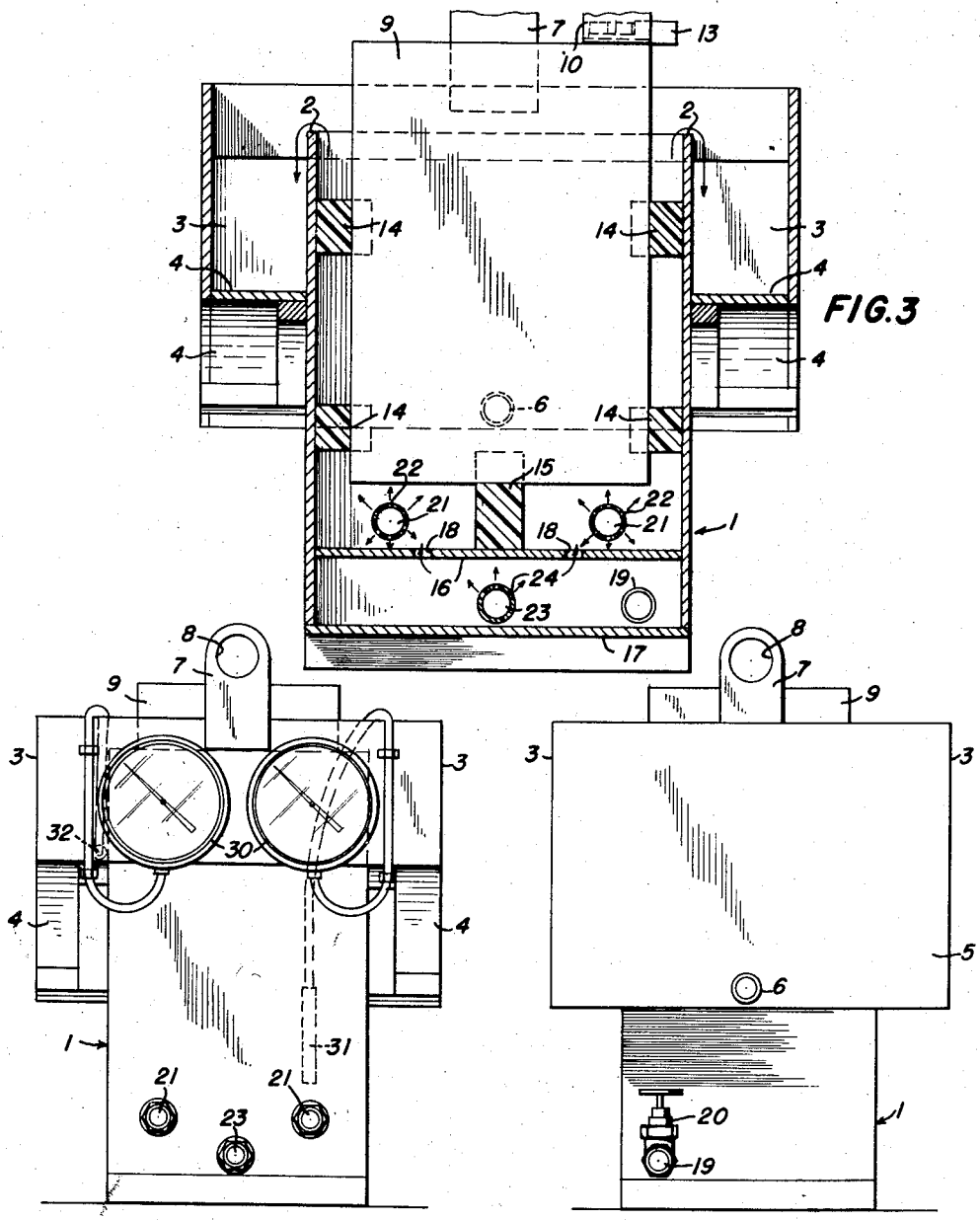

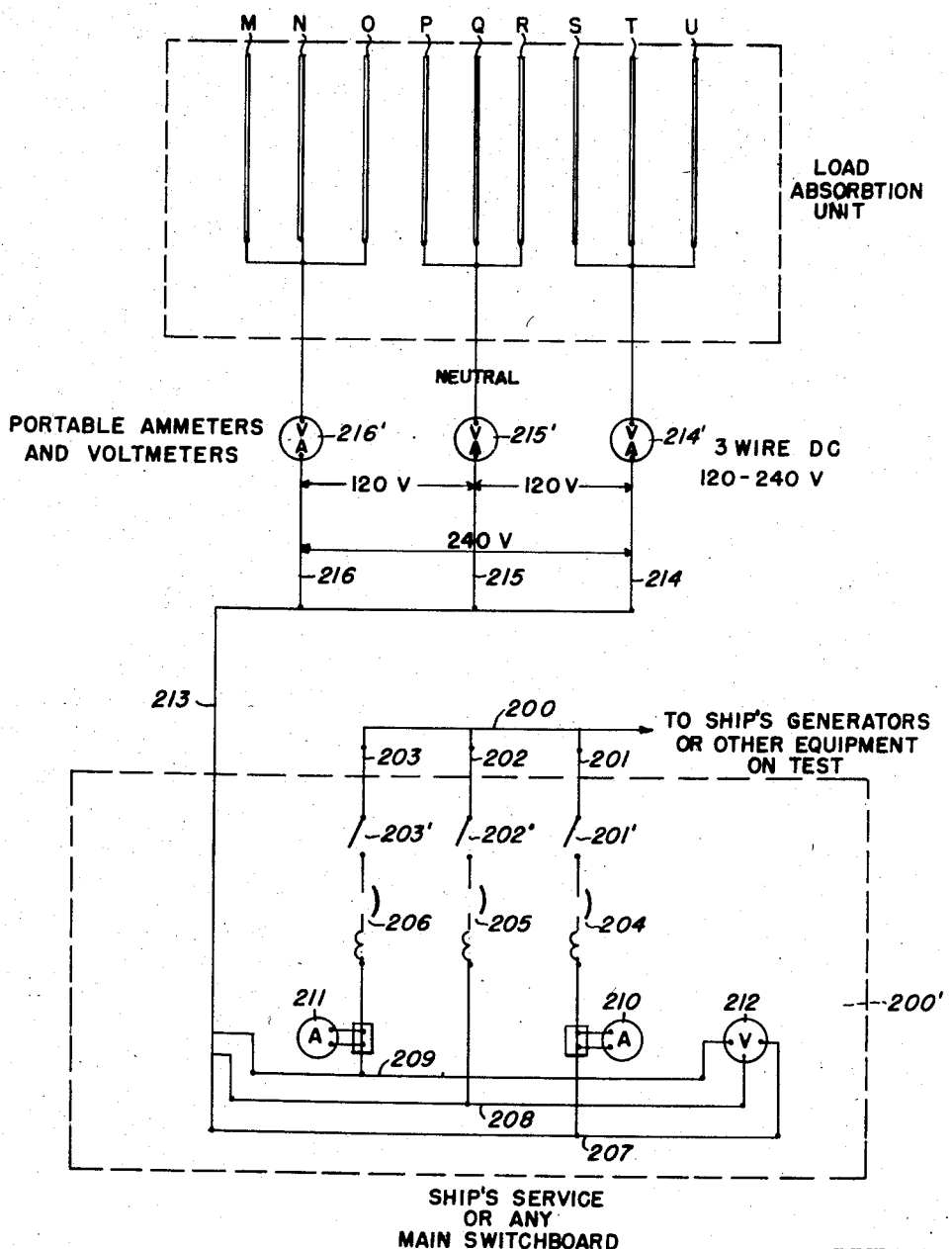

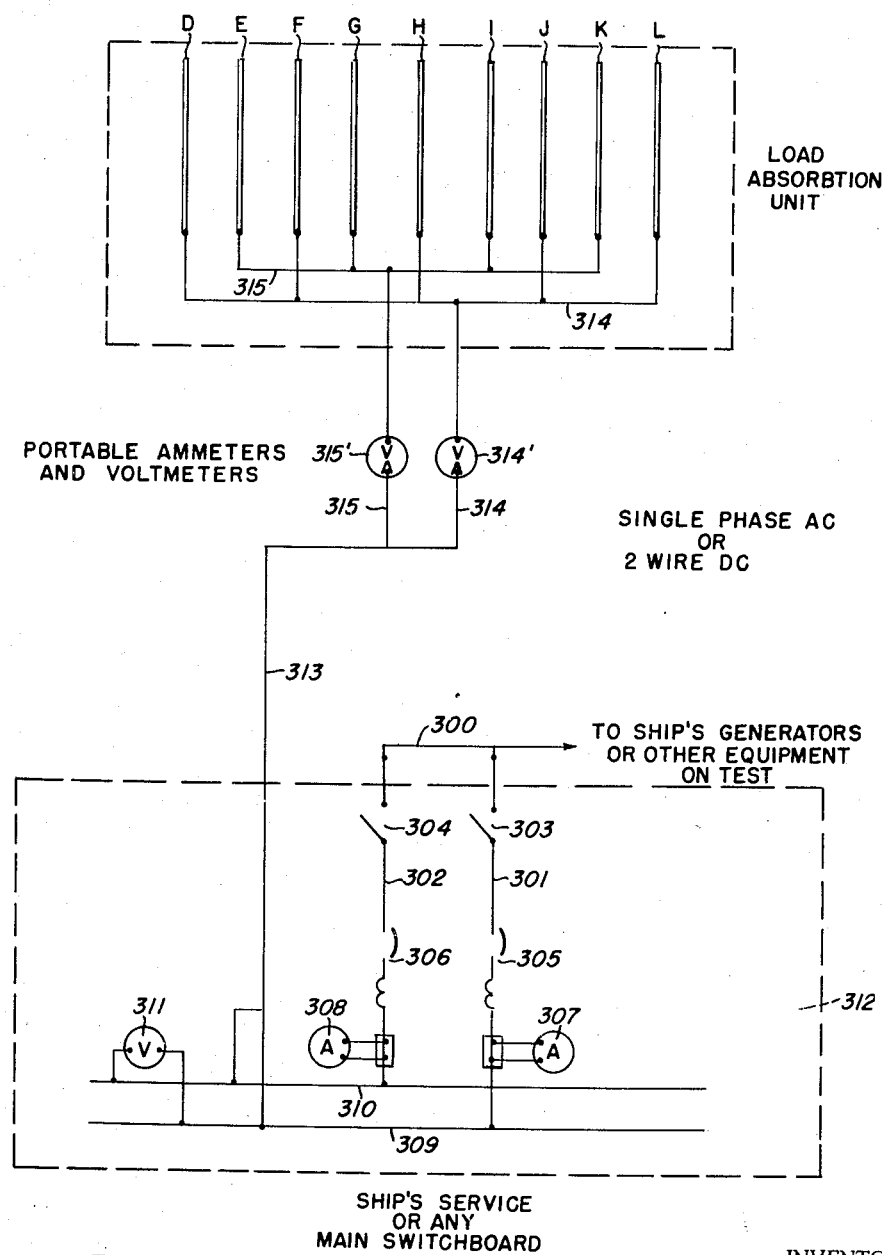

United States Patent Office 2,868,932
Patented Jan. 13, 1959

2,868,932

DUMMY LOAD RESISTOR

John A. Schonhoff, Long Green, and William J. Borkowski, Baltimore, Md., assignors to Maryland Shipbuilding and Drydock Company, Baltimore, Md., a corporation of Maryland Application September 19, 1956, Serial No. 610,739

4 Claims. (Cl. 201—57)

This invention relates to dummy load resistors for testing electrical equipment.

The dummy load resistor herein described is a lightweight, high capacity, compact, safe mechanism for providing a constant or variable load for testing electrical motors, generators, switchboards, circuit breakers and controllers. Because of its ease of operation, limited space requirements, efficiency, and low cost, it has made obsolete its predecessor, the jumbo size salt water box in which plates were lowered and raised in a saturated salt solution.

This dummy load resistor has a container with weirs on either side thereof. The weirs permit quick dissipation of the gases generated through electrolytic action. The current passes between electrodes suspended in a solution in the container. There is an ingress pipe at the bottom of the container for a water solution, such as sea water or water having an acid in solution. This water may be called "raw water" and ordinarily in the harbors near cities, the harbor water furnishes a good raw water because it not only contains salt from the sea water but also a good deal of acid. The chemical in solution raises the conductivity of the liquid; the higher the saline or acid content, the lower the resistance to the flow of current. Often river water will contain enough acid for the purpose. Also means can be provided to add a soluble salt such as sodium chloride or a soluble acid to give a desired solution strength.

In the ingress pipe at the bottom of the container for the water solution, there is a valve. Two ingress pipes are on either side of the container for fresh water, and a valve provides means for regulating the flow from these fresh water pipes. There is a connecting line between the fresh water and the water solution pipes permitting intermingling of fresh water or water solution or raw water before it enters the container of the dummy load resistor, and there is a valve in this connecting line. If desired, all water control valves may be automatically operated for remote control of the unit.

The fresh water pipes are positioned above the raw water pipe which latter enters the bottom of the container; all the pipes, for their length within the container, are provided with apertures. The exact arrangement of pipes can be changed as desired though under general operations, the particular arrangement is advantageous. There is a baffle with apertures in it located above the bottom of the container and between the pipe for the raw water and the fresh water pipes. This permits thorough intermingling, because of eddy currents, between the raw water and the fresh water and provides a uniform solution between the electrodes which is highly desirable. The baffle is particularly advantageous where there is not sufficient chemical in solution in the raw water and where, for instance, sodium chloride is placed in the bottom of the container. Thermometers are furnished in the container and immersed in the liquid at desirable points, such as near the bottom of the container, and near the discharge of the liquid over the weir, so that no hot spots will prevent the proper functioning of the device. If during operation the water boils, the maximum load has been exceeded and it is desired to keep the temperature at or below 200° F.

This adjustable dummy load resistor, to be more fully described hereinafter, improves the procedure of supplying constant or changeable loads for testing electrical equipment, for checking operational settings of electrical controls, and for paralleling generators so that convenience and control now feature an operation which formerly was both cumbersome and costly. This unique characteristic makes it an asset for manufacturers of motors, generators, pumps, switchboards, etc., as well as contractors, constructors and shipyards, for electrical testing and loading assignments.

Because the conductivity of the electrolytic solution can be varied by changing its salinity or acidity, the user may impose electrical loads at will, and instantly, upon the units being tested or operated.

When in use, the dummy load adjustable resistor is placed in an outdoor, or well ventilated indoor, location convenient to the device to be tested or operated and connected to the fresh water and raw water supplies. The water outlet and the electrolyte dump valve are connected as desired to a hose leading overboard or to a suitable run-off. The electrical conductors from the switchboard are connected to the plate terminals and a grounding cable properly secured. The dummy load adjustable resistor is thereafter filled to the operating water level with fresh water by means of the water supply valves. With these simple preparations, the adjustable resistor is ready for operation.

The electrical load may be applied to the plates as desired and subsequently increased by supplying salt or raw water to the unit. As previously pointed out, the maximum capacity of the unit has been exceeded when the electrolyte boils. The heated water is carried away by the run-off. The amount of water run-off required is proportional to the electrical load imposed on the unit. The resistance of the unit is increased by adding fresh water, and decreased by adding salt water or raw water with suitable acidity.

Shut-down of the adjustable resistor is likewise simple. The electrical cables and ground wire are disconnected by means of switch and circuit breakers, the water outlet valve is then opened, and finally, in case of a continued shut-down, the electrolyte is drained from the brine chamber. Then only may the cable be disconnected from the units. For storage, the brine chamber should be flushed thoroughly with fresh water.

Some of the unique, advanced characteristics of the adjustable dummy load resistor are: (1) its stationary multiplate elements, adaptable to direct current, to a single phase alternating current, and to three-phase alternating current, (2) the control of resistance by regulating the flow and the admixture of fresh water and salt (or raw) water, and (3) the effective release of the gases of electrolytic action.

It is desired that the invention be limited not by the actual showings of the drawings but that all forms within the invention concept be covered. Further advantages of the construction and further objects will be apparent from the ensuing description.

In the drawings:

Figure 1 is a top perspective view of the dummy load resistor;

Figure 2 is a top plan view of the construction shown in Figure 1;

Figure 3 is a sectional view taken along the line 3—3 of Figure 2, looking in the direction of the arrows;

Figure 4 is an end view looking from the righthand of Figure 1;

Figure 5 is an end view of the opposite end of the construction from that shown in Figure 4;

Figure 7 is a wiring diagram for the combination of the main switchboard and the load absorption unit in a three-wire direct current arrangement;

Figure 8 is a wiring diagram for the combination of the main switchboard and the load absorption unit where the arrangement is for a single phase alternating current, or for a two-wire direct current; and Figure 9 is a diagrammatic view of the arrangement of pipes and valves for supplying liquid to the container.

Figure 6:
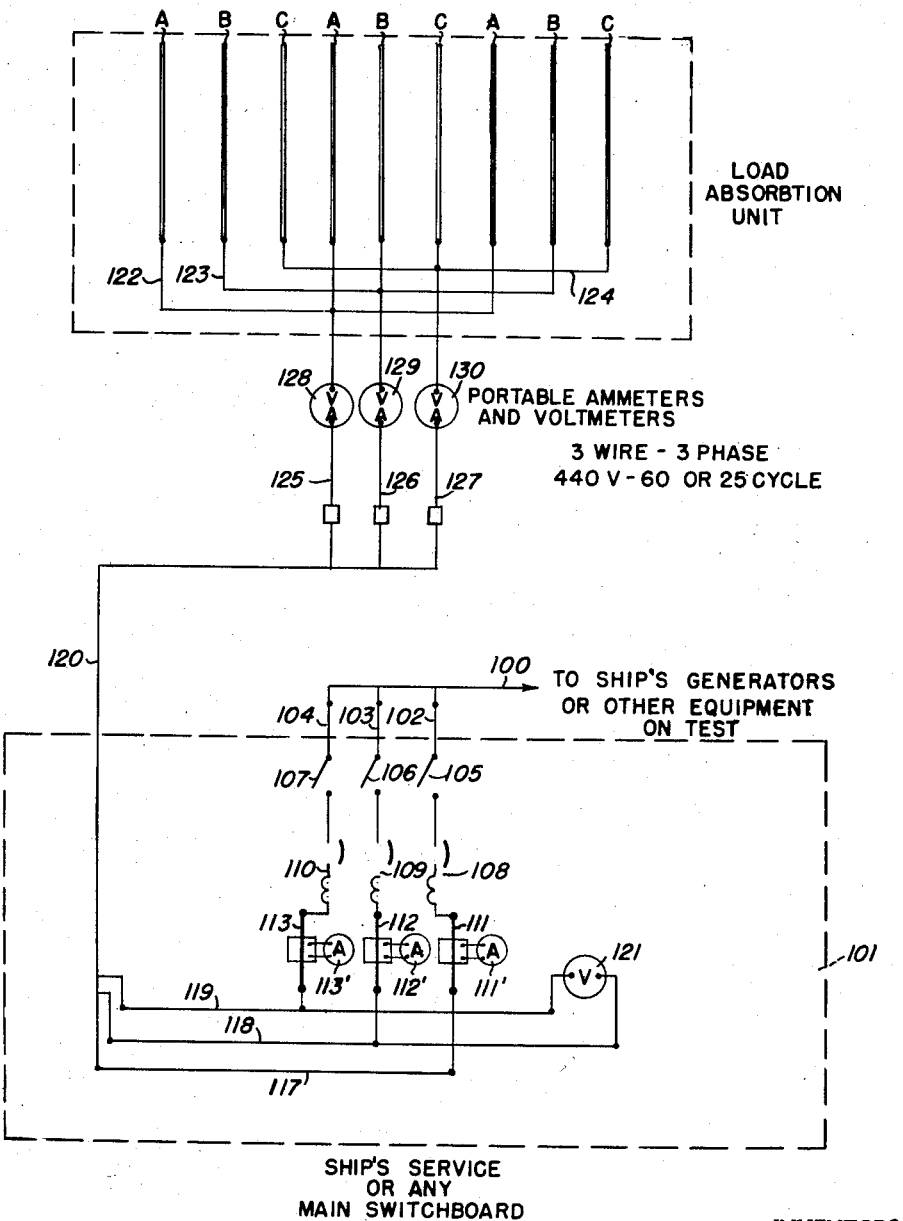
Figure 6 is a wiring diagram for the main switchboard and the load absorption unit in combination. The diagram is for a three-wire, three-phase arrangement.

In the drawings, I have shown a container 1 which may be made of wood, metal or other suitable material. Container 1 is adapted to house parts of the dummy load resistor and the liquid in which the cathode and anode plates are immersed. At the top of the container, the liquid therein, which may consist of fresh water and a solution such as salt water or water having acid therein, is adapted to flow over edges of the container comprising side weirs 2 and into channels 3. Channels 3 are provided with sloping bottoms 4 which cause the liquid in the container 1 to run forward to a collecting chamber 5. The collecting chamber 5 is provided with a run-off pipe 6 which is adapted to discharge the liquid into some suitable sump, or sewer pipe, or into the water of the harbor in case the device is used in testing shipboard apparatus. The container 1 is provided with upstanding ears 7, having apertures 8 therein, and these apertures are adapted to receive grappling members which will permit the transportation of the unit.

Supported within the container 1 are a series of cathode and anode plates 9. There are provided two sets of connections for each plate 9. These include upstanding ears 10, each provided with a base 11. There are apertures 12 in each ear so that electrical connections can be made to each plate, also connections 13 are provided on each base 11. This enables any desired grouping of the cathode and anode plates to be made, for the plurality of electrical connections for each plate gives flexibility in operation. The unit is suitably grounded through connections not shown.

The cathodes and anodes 9 are held in parallel relationship in slotted racks which may be phenolic material, or asbestos blocks similar to the commercial material called "transite." There are provided two slotted racks 14 attached to the inside of the container 1 on each side and a bottom slotted rack 15 attached to a false bottom 16 spaced above the bottom 17 of the container 1.

The false bottom 16 is provided with apertures 18 through which liquid is adapted to pass. Adjacent the bottom 17 is a dump pipe 19 having a valve 20. When testing is completed, the valve 20 is opened and the liquid in the system discharged into the harbor or some other suitable place. After dumping and prior to storage, the entire apparatus should be disconnected and flushed to prevent deterioration.

Entering this container 1 at a point above and adjacent the false floor 16 are two pipes 21 which are fresh water pipes. Along those portions of pipes 21 within the container, apertures 22 are provided throughout their periphery as shown in Figures 3. Below the false floor 16, a salt water pipe 23 enters the container. Along the portion of pipe 23 within the container apertures 24 are provided over its upper half. It has been found that the arrangement of fresh and salt water pipes just described is in general desirable, but the disposition of the pipes can be varied to meet the exigencies of operation.

Referring to Figure 9, fresh water is supplied through a pipe 25 having a control valve 26 to the two pipes 21. Salt water is introduced through pipe 23 and the amount can be varied by a control valve 27. There is a connecting pipe 28 between pipe 25 and pipe 27 and a control valve 29 in that pipe. Thus salt water may be introduced into pipe 25 or fresh water into pipe 23 prior to the entry of liquid into the container 1.

It will be noted that in the diagrammatic showing of Figure 9, there is shown in dotted lines a container for a batch of salt which may be placed on the bottom 6 of the container. This may be necessary where salt or raw water are not available. As previously explained, salt in the water, or acid, both of which are generally present in harbor water, decrease the resistance between the plates.

In operation the unit is supplied with salt or acid water and fresh water, the arrangement of the apertures in the pipes within the container causing thorough mixing as also the apertures 18 in the false bottom 16. Eddy currents insure to a maximum extent that the liquid in contact with the cathode and anode plates is uniform. This is highly desirable. The flow of the liquid through the container prevents hot spots which would make the operation non-uniform. While testing is under way, there is much gas given off by the liquid due to electrolytic action, and so there must be good ventilation in the vicinity of the unit. The weirs permit ready ventilation of the unit itself and ready escape of gases. If desired, these gases may be collected and stored.

Since prevention of hot spots is desirable, there are thermometers 30 located in various localities within the container, the dials being shown mounted on the unit. These dials are connected to heat sensing elements 31 and 32 located respectively near the bottom of the plates 9 and at the point where the liquid in the unit is discharged over the weir. As before pointed out, the temperature should be kept in general below 200° F., for boiling at any point will put a limit on the impedance between plates at the locality where that hot spot develops. A copious flow of liquid throughout the unit keeps the temperature down.

The combination of the unit in circuits to utilize the favorable characteristics of the combination will now be described. Certain underlying factors are present in the circuit arrangement that makes them effective but each type of circuit presents problems which are inherent in that particular circuit.

Referring to Figure 6, there is shown a wiring diagram for a three-wire, three-phase circuit which incorporates the unit in operative combination with the other elements of the system. Let us assume that it is desirable to place a load on generators, such as generators on board a ship; a three-wire cable 100 is run from the generators to the ships service or main switchboard 101. Each of the leads 102, 103 and 104 of the cable pass through switches 105, 106 and 107 respectively, and then through circuit breakers 108, 109 and 110 to protect the circuits from dangerous overload. The circuit breakers may be calibrated to operate when the limits of the units they protect are reached. In the lines from the circuit breakers are connected transformers 111, 112 and 113.

Ammeters 111', 112' and 113' are associated with each transformer and will enable the switchboard operator to determine the current amperage. Leads 117, 118 and 119 connect the bus of each current transformer 111, 112 and 113 to a three-wire cable 120 leading to the dummy load resistor unit. Across leads 118 and 119 is connected a voltmeter 121. The voltmeter 121 and the ammeters will enable the operator to determine the voltage and current on the apparatus being tested.

However, there must be a safety factor to prevent overloading of the dummy load resistor, so readings are necessary at the unit itself. The plates of the unit are connected as shown; the three plates A, such being the first, fourth and seventh of the nine plate system, are connected to a lead 122; the three plates B, such being the second, fifth and eighth plates of the system, are connected to a lead 123; the three plates C, such being the third, sixth and ninth plates of the system, are connected to a lead 124. The leads 125, 126 and 127 of the three-wire cable are connected to leads 122, 123 and 124 respectively. There are ammeter-voltmeters 128, 129 and 130 located respectively in leads 125, 126 and 127. By locating individual ammeter-voltmeters in the circuits to the plates, overloading and fluctuation of the load can be detected locally at the unit and inaccuracy or damage to equipment can be minimized. These ammeters-voltmeter instruments are of portable type for they are subject to variation in use and must be frequently checked and corrected in their readings. The difference between the readings of the voltmeter at the unit and the voltmeter at the switchboard will be the voltage drop in the cables used to connect the unit.

There is shown in Figure 7 the combination of an operative three-wire direct current circuit with the dummy load resistor. A three-wire cable 200 runs from the ships generators, or other equipment to which the load is to be applied, to a main switchboard 200'. Leads 201, 202 and 203 from the cable, in which there are located respectively circuit breakers 204, 205 and 206 to prevent harmful overloading, are connected to leads 207, 208 and 209. Switches 201', 202' and 203' are provided in the leads 201, 202 and 203. Across lead 201 is shunted an ammeter 210 and across lead 206 is shunted an ammeter 211. A voltmeter 202 is connected to the leads 207, 208 and 209. The total load indicated by the ammeters and voltmeters on the main switchboard 200' will be the load that is placed on the equipment being tested by the dummy load resistor and the cable losses. The cable losses from the main switchboard to the dummy load resistor are determined from portable ammeters and voltmeters at the unit.

The leads 207, 208 and 209 are incorporated in a three wire cable 213 from which leads 214, 215 and 216 run to the plates of the dummy resistor. Lead 214 is connected to plates S, T and U, such being the seventh, eighth and ninth plate of the nine plate resistor. In lead 214 is an ammeter-voltmeter 214'. Plates P, Q and R, the third, fourth and fifth plates of the resistor, are connected to lead 215 which is the neutral wire of the system. There is an ammeter-voltmeter 215' in lead 215. Lead 216 is connected to plates M, N, and O, the first, second and third plates of the resistor and there is an ammeter-voltmeter 216' in the lead 216. The ammeter-voltmeters are of a removable type to enable their ready substitution for correction in use without shutting down the whole system.

By having ammeter-voltmeters at the immediate location of the resistor, failure and overloading can be avoided, for if difficulties in operation occur they can be quickly detected.

In Figure 8, there is illustrated the combination of a single phase alternating current, or two-wire direct current, system with the dummy load resistor. Here there is a two-wire cable 300 to the ships generators, or other equipment under test. There are leads 301 and 302 from the cable and in these leads are switches 303 and 304 and circuit breakers 305 and 306 to prevent overloading. Shunted across lead 301 is an ammeter 307 and across lead 302 an ammeter 308.

Leads 301 and 302 are connected to leads 309 and 310 and a voltmeter 311 is connected across leads 309 and 310. The total impedance of the system is obtainable by means of the ammeters and voltmeters, which are all carried by the main switchboard 312 and is the sum of the impedances represented by the cable losses to the dummy load resistor plus the load imposed by the dummy load resistor. There is a two-wire cable 313 connected to the main switchboard and to the dummy load resistor. One of the leads 314 from the two-wire cable is connected to plates D, F, H, J and L of the nine plate resistor and in the lead 314 is an ammeter and voltmeter 314'. The alternate plates E, G, I and K of the resistor are connected to lead 315 of the two-wire cable 313 and there is located in the lead 315 an ammeter and voltmeter 315'. The ammeter and voltmeters just referred to are of portable type so that an instrument can be regularly tested and calibrated, assuring correct readings at the dummy load resistor.

It is desired that the scope of the invention be limited solely by the scope of the appended claims and the showing of the prior art.

We claim:

1. A dummy load resistor comprising a container, weirs on either side thereof, electrodes in the container, an ingress pipe at the bottom of the container for a water solution, a valve in said pipe, two ingress pipes on either side of the container for fresh water, valve means regulating the flow from the fresh water pipes, said fresh water pipes being positioned above the first-mentioned pipe, apertures in said pipes over the portions thereof within the container, a baffle with apertures therein located above the bottom of the container and between the pipe for the solution and the fresh water pipes, a connection line between the fresh water and solution pipes, and a valve in said connection line permitting mixing of the solution and the fresh water before the discharge of said pipes into the container.

2. A dummy load resistor comprising a container, weirs on either side thereof, electrodes in the container, an ingress pipe at the bottom of the container for a water solution, a valve in said pipe, two ingress pipes on either side of the container for fresh water, valve means regulating the flow from the fresh water pipes, said fresh water pipes being positioned above the first-mentioned pipe, apertures in said pipes over the portions thereof within the container, a baffle with apertures therein located above the bottom of the container and between the pipe for the solution and the fresh water pipes, a connection line between the fresh water and solution pipes, a valve in said connection line permitting mixing of the solution and the fresh water before the discharge of said pipes into the container, and thermometers in the liquid connected to points adjacent the bottom of the container and to the discharge point of the liquid over a weir.

3. A dummy load resistor comprising a container, discharge means for the container, electrodes in the container, an ingress pipe at the bottom of the container for a water solution, a valve in said pipe, two ingress pipes on either side of the container for fresh water, valve means regulating the flow from the fresh water pipes, said fresh water pipes being positioned above the first-mentioned pipe, apertures in said pipes over the portions thereof within the container, a baffle with apertures therein located above the bottom of the container and between the pipe for the solution and the fresh water pipes, a connection line between the fresh water and solution pipes, and a valve in said connection line permitting mixing of the solution and the fresh water before the discharge of said pipes into the container.

4. A dummy load resistor comprising a container, discharge means for the container, electrodes in the container, an ingress pipe at the bottom of the container for a water solution, a valve in said pipe, two ingress pipes on either side of the container for fresh water, valve means regulating the flow from the fresh water pipes, said fresh water pipes being positioned above the first-mentioned pipe, apertures in said pipes over the portions thereof within the container, a baffle with apertures therein located above the bottom of the container and between the pipe for the solution and the fresh water pipes, a connection line between the fresh water and solution pipes, a valve in said connection line permitting mixing of the solution and the fresh water before the discharge of said pipes into the container, and thermometers in the liquid connected to points adjacent the bottom of the container and to the discharge point of the liquid over a wier.

(References on following page)

References Cited in the file of this patent

UNITED STATES PATENTS

| | | |
|---|---|---|
| 756,605 | Dysterud | Apr. 5, 1904 |
| 1,784,332 | Brooke | Dec. 9, 1930 |
| 2,004,569 | Davis | June 11, 1935 |
| 2,632,077 | Halter | Mar. 17, 1953 |
| 2,769,072 | Obenshain | Oct. 30, 1956 |

OTHER REFERENCES

"Taking the Steam Out of A Liquid Rheostat"; General Electric Review, May 1953; pp. 33–36.